United States Patent [19]

Clem et al.

[11] Patent Number: 4,605,240

[45] Date of Patent: Aug. 12, 1986

[54] ELECTRONICALLY CONTROLLED BICYCLE TRANSMISSION

[75] Inventors: William E. Clem; William C. Trethewey, both of Lancaster, Ohio

[73] Assignee: Telewe', Inc., Lancaster, Ohio

[21] Appl. No.: 524,445

[22] Filed: Aug. 18, 1983

[51] Int. Cl.[4] ............................ F16H 7/22; F16H 9/00
[52] U.S. Cl. .................................. 280/236; 280/238; 364/424.1; 474/70; 474/80
[58] Field of Search ............... 280/236, 237, 238, 6 R, 280/6 H; 474/70, 80, 82; 364/424.1

[56] References Cited

U.S. PATENT DOCUMENTS

| | | | |
|---|---|---|---|
| Re. 30,758 | 10/1981 | Lang | 474/80 |
| 3,919,891 | 11/1975 | Stuhlmuller et al. | 474/70 |
| 4,041,788 | 8/1977 | Nininger, Jr. | 474/80 |
| 4,065,983 | 1/1978 | Mimura | 280/236 X |
| 4,143,557 | 3/1979 | Wakebe et al. | 474/80 |
| 4,380,048 | 4/1983 | Kishi et al. | 364/424.1 |
| 4,411,334 | 10/1983 | Schlanger | 280/6 R X |

Primary Examiner—Joseph F. Peters, Jr.
Assistant Examiner—Mitchell J. Hill
Attorney, Agent, or Firm—Frank H. Foster

[57] ABSTRACT

An electronic/electromechanical transmission shifter has a velocity detector which generates an electrical signal representing the vehicle velocity. A microcomputer is connected to the velocity detector, to a plurality of manually controlled switches and to a digitally controlled linear actuator which is linked to the shift member of the vehicle. The shifter position is detected by a cam mounted on the screw shaft of the linear alternator operating against a plurality of microswitches which are mounted about and axially spaced along the screw shaft. The cam follower portions of the microswitches are engagable with the cam to indicate shifter position.

1 Claim, 6 Drawing Figures

ELECTRONICALLY CONTROLLED BICYCLE TRANSMISSION

FIELD OF THE INVENTION

This invention relates generally to automatic transmissions for human powered vehicles, such as bicycles, and more particularly relates to an electronic control system for such a transmission which responds to a multiplicity of input control parameters including operator selected inputs.

BACKGROUND ART

Bicycles and other people powered vehicles are often equipped with variable speed transmissions in order to accomodate different riding conditions and the comfort of different riders. These transmissions are shifted to permit changes in wheel torque and gear ratios so that the operator of the vehicle may pedal at a pedal speed and torque which are most comfortable for that operator under the conditions he is currently encountering.

Although some people enjoy manually shifting such transmissions others do not and merely want to enjoy the pleasure of riding the vehicle and the exercise they receive without being bothered with gear shifting decisions and manipulations. Such people often shift improperly causing damage to the vehicle and a rough uncomfortable ride.

A variety of other automatic transmission shifters for bicycles and other vehicles have been suggested in the past. They have typically been mechanically, hydraulically or pneumatically operated devices. One such device is shown in U.S. Pat. No. 4,352,503 to Cotter.

Although such prior systems are simple, reliable and effective, they have a limited flexibility and provide only a small variety of operational features in their operating mode.

For example, bicycles are the most common people powered vehicles and a derailleur system for shifting the drive chain between multiple sprockets is the most popular type of transmission. They are manufactured in 3, 5, 10, 12 and 15 speed models which must be conventionally shifted by the rider. Automatic transmissions which have been designed in the past for such vehicles have not had the capability of conveniently displaying to the driver information indicating which sprockets are currently being used, they cannot automatically lock the transmission in low gear when the rider is riding uphill or provide a variety of other features which would be useful.

BRIEF DISCLOSURE OF THE INVENTION

The invention is an improved automatic shifter for shifting the transmission of a human powered vehicle which includes pedals drivingly connected through a variable speed transmission to a wheel and a movable shift member which is moved to change the transmission ratio. The improvement is an electronic and electromechanical transmission shifter. It has a velocity detector which generates an electrical signal representing the angular velocity of a wheel of the vehicle. A programmable microcomputer has its inputs connected to the output of the velocity detector and also has inputs connected to the output of a plurality of manually controlled switches. The microcomputer is connected to a digitally controlled motor/actuator having its controlled output shaft linked to the shift member of the vehicle. A source of electrical energy must be connected to these elements to operate them.

Figure 1:
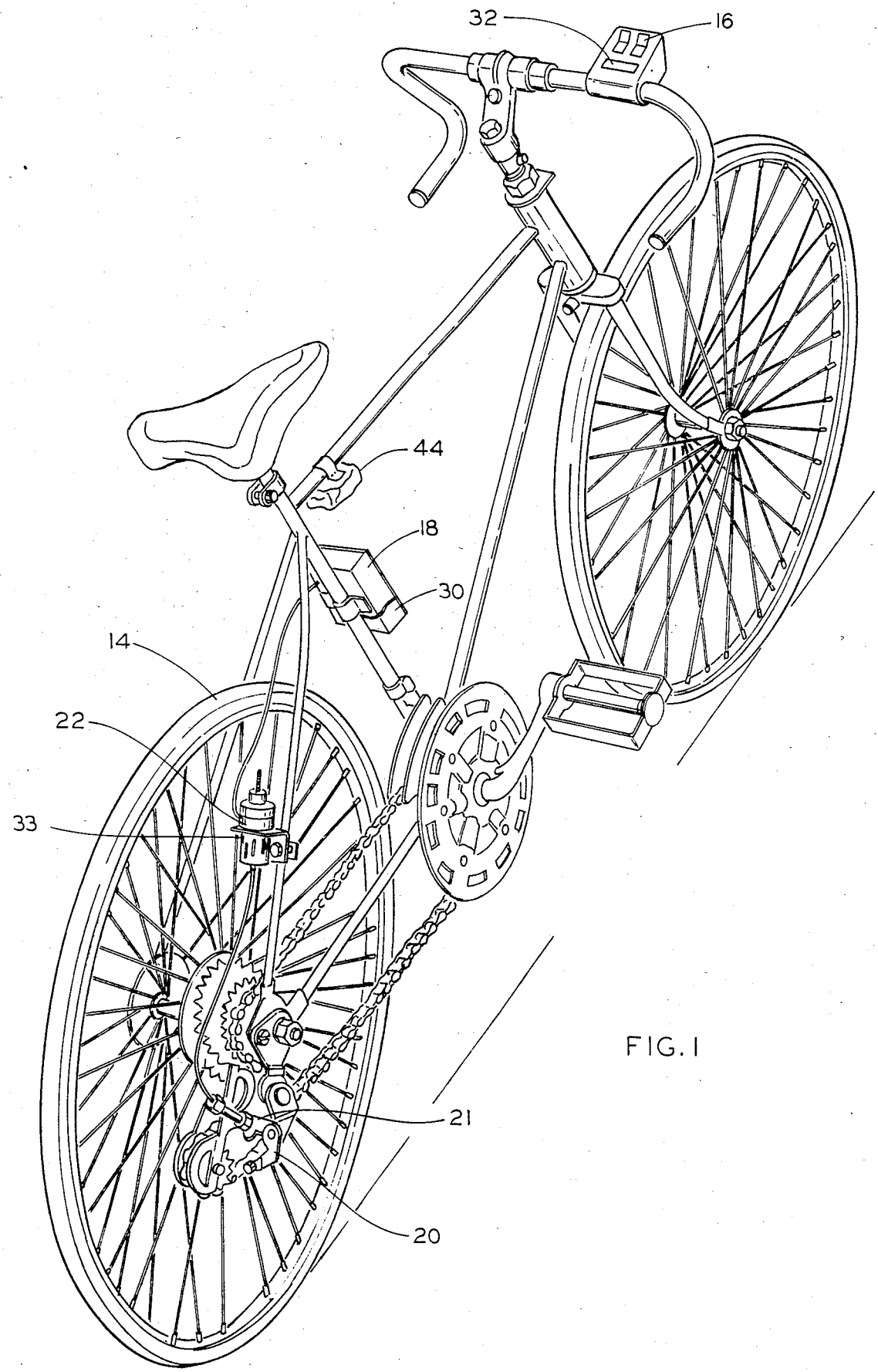
FIG. 1 is a view in perspective illustrating a bicycle having integrally mounted thereon the preferred embodiment of the invention.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose.

DETAILED DESCRIPTION

FIGS. 1-4 illustrate a conventional 10 speed bicycle having a transmission formed by a derailleur system 20, two sprockets fixed for rotation with the pedals and five sprockets drivingly linked to the rear wheel. The derailleur 20 has a movable shift member 21 for changing the transmission ratio by shifting the bicycle drive chain from one sprocket to another. The embodiment of the invention illustrated in FIGS. 1-4 is attached to and controls only the rear derailleur for selecting on of the five sprockets depending upon conditions and the input commands of the rider. The principles of the invention are also applicable to the front derailleur.

Figure 2:
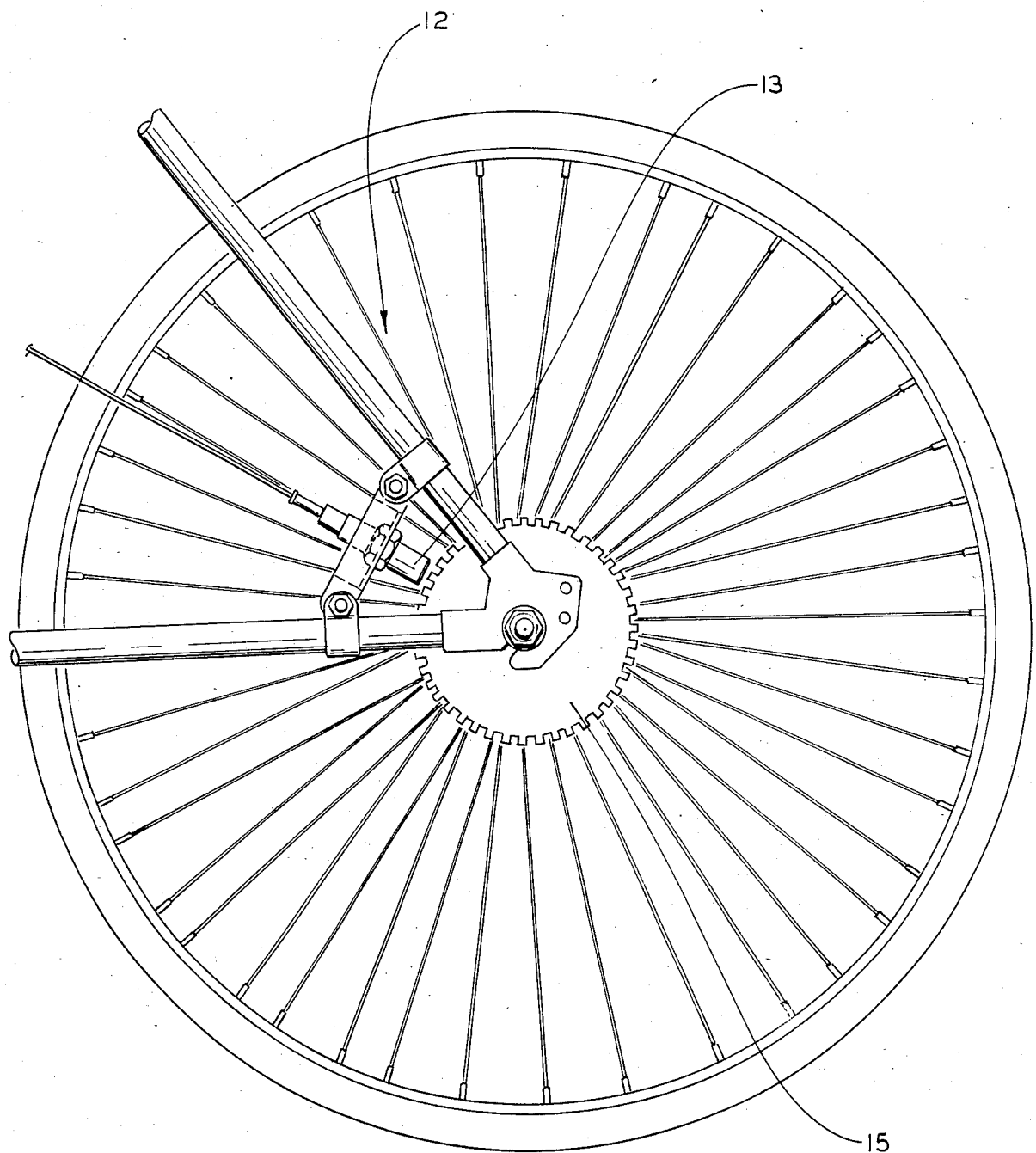
FIG. 2 is a detailed view in side elevation of the opposite side of the rear wheel of the bicycle of FIG. 1 illustrating the angular velocity detector.

A velocity detector 12, shown in detail in FIG. 2, for generating an electrical signal representing the angular velocity of the rear wheel 14, is attached to the bicycle frame. It has a pickup or sensor 13 which cooperates with a disk 15 fixed to the bicycle wheel to rotate with it and having a plurality of projections each of which generates a pulse in the sensor 13. The velocity detector 12 is of standard construction such as an Eaton electrical/electronic control sensor 48770-400 or one manufactured by Westberg Manufacturing Company and listed as their catalog number 410 capable of operating in a range of 0 to 500 RPMS. It generates a pulse train in which the number of pulses per second is proportional to the angular velocity of the wheel.

A plurality of manual control switches preferably in the form of rocker switches 16 are mounted on the handlebars and oriented for ease of actuation by the bicycle rider.

The velocity detector 12 and the control switches 16 are the two principal input devices for providing information, in the form of electronic data signals, to a conventional programmable microcomputer housed in a circuit cabinet 18 also mounted to the bicycle frame.

A digitally controlled motor/actuator means is linked to the shift member 21 of the derailleur 20 for controlling the position of the derailleur. In the preferred embodiment the digitally controlled motor/actuator means comprises a digital, linear actuator 22 and its accompanying control circuitry which may be mounted in the circuit cabinet 18 with the microcomputer.

For example, the digital, linear actuator 22 may be one manufactured by Airpax and sold as their model series 92200. It may use a linear actuator controller, also sold by Airpax, as model SAA1027. This linear actuator is digitally actuated so that its controller may be connected directly to the microcomputer circuitry. Because the linear actuator can be stepped in either direction, the spring bias on the derailleur is unnecessary.

All of the electrically powered elements of the embodiment of the invention are powered by a battery enclosed in a battery support housing 30 mounted to the bicycle frame beneath the circuitry housing 18.

Some additional features may be added to the fundamental enbodiment of the invention. For example, a digital display 32, such as a conventional liquid crystal or LED seven element display may also be mounted on the handlebars and connected to the programmable microcomputer. Desirably it can display useful information to the rider such as the particular sprockets which are currently engaging the drive chain, vehicle speed, elapsed distance to form an odometer, elapsed time, power supply conditions and warnings for unsafe conditions. The microcomputer includes a real time clock so that the real time data and the angular velocity data from the velocity detector 12 may be processed in the conventional manner to generate speed, elapsed distance, and elapsed time data for display on the display 32.

Figure 3:
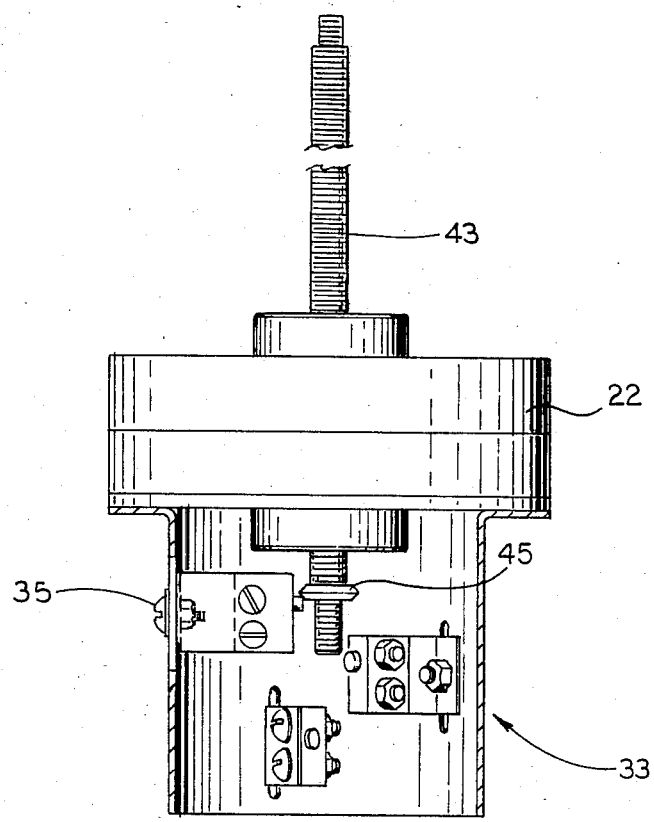
FIG. 3 is a view in vertical section illustrating the construction of a shifter position detector embodying the present invention.
Figure 4:
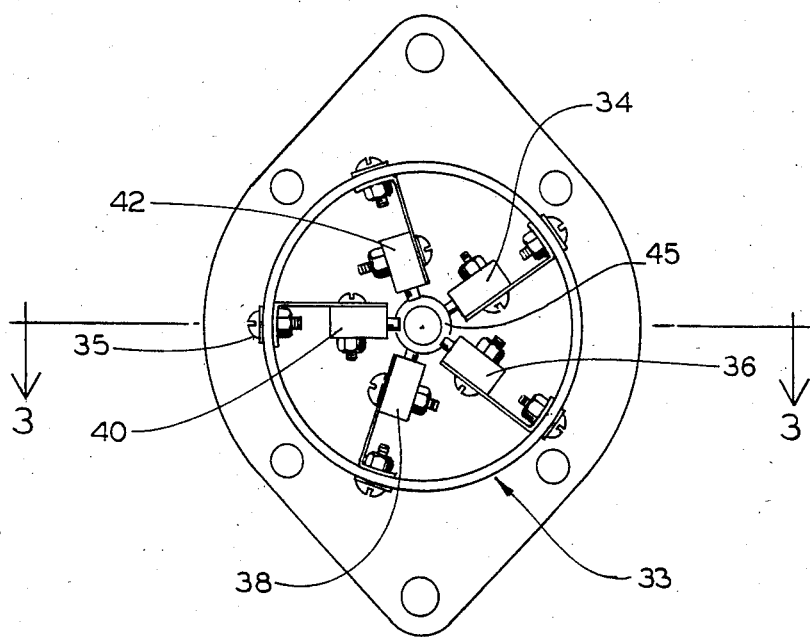
FIG. 4 is an end view of the position detector of FIG. 3.

Gear ratio or transmission position data may be detected by suitable position detecting apparatus. Preferably, as illustrated in FIGS. 3 and 4, microswitches are mounted about the screw shaft 43 of the stepping motor of the linear actuator 22. They are axially spaced at positions corresponding to the different shaft positions for each of the five derailleur positions and engage a disk 45, forming a cam mounted to the screw shaft 43, as the shaft is axially translated. Each of these five microswitches is electrically connected to the microcomputer. The on or off position of these five microswitches is strobed by the programmable microcomputer to provide data to the microcomputer signalling the position of the derailleur 20. This provides not only information for the display 32 but also provides feedback for the transmission control function of the microcomputer 18.

Thus, the computer, after determining that a change in gear ratio is desired, sends a signal to the stepper motor controller to initiate the shifting operation. The shifting operation is stopped when the microswitch at the position to which the transmission is being shifted is actuated and that actuation is detected by the computer.

Because different manufacturers build derailleurs of different styles with different spacing between drive positions, the microswitches 34-42 are preferably mounted at a series of spaced slots around the cylindrical support 33. Clamping screws, such as clamping screw 34, may extend through the slots into threaded engagement with the microswitch mounting brackets. The screws may be loosened to permit axial sliding of the microswitches to the correct derailleur drive positions. Each microswitch is slid to a different one of the drive positions and its mounting screw then tightened to retain it in that position. In this manner the microswitches may be easily custom adjusted and calibrated for the derailleur system to which they are being used.

An attitude detector 44 is also mounted on the frame of the bicycle and consists of a double-ended mercury switch of the type manufactured by Honeywell Corporation. Such a switch is an elongated glass envelope having a pair of electrical probes extending into each opposite end of the envelope. When the rider is riding up a sufficiently steep incline the mercury will roll by gravity to the aft end of the envelope providing a connection between the aft two probes which are connected to the microcomputer to signal an upward incline. Similarly, when the rider is going down a downward incline gravity pulls the mercury to the forward end of the envelope electrically connecting the forward probes which are connected to the microcomputer for signalling to the microcomputer that the rider is riding down an incline.

The battery 30 is preferably a nickel cadmium, rechargeable battery operating at 12 volts and capable of delivering 10 ampere-hours. Preferably, its condition is monitored by a battery monitor which may also be physically positioned in the circuitry cabinet 18. Advantageously, the battery monitor is a conventional analog to digital converter, the output of which is connected to the microcomputer so that data respresenting the voltage level of the battery may be processed by the computer.

As additional alternatives, the battery energy may be replenished by connection of the battery to a conventional bicycle generator powered by the rider and drivingly linked to the wheels or drive train of the bicycle and/or may also include solar cells for charging the battery by solar energy.

Figure 5:
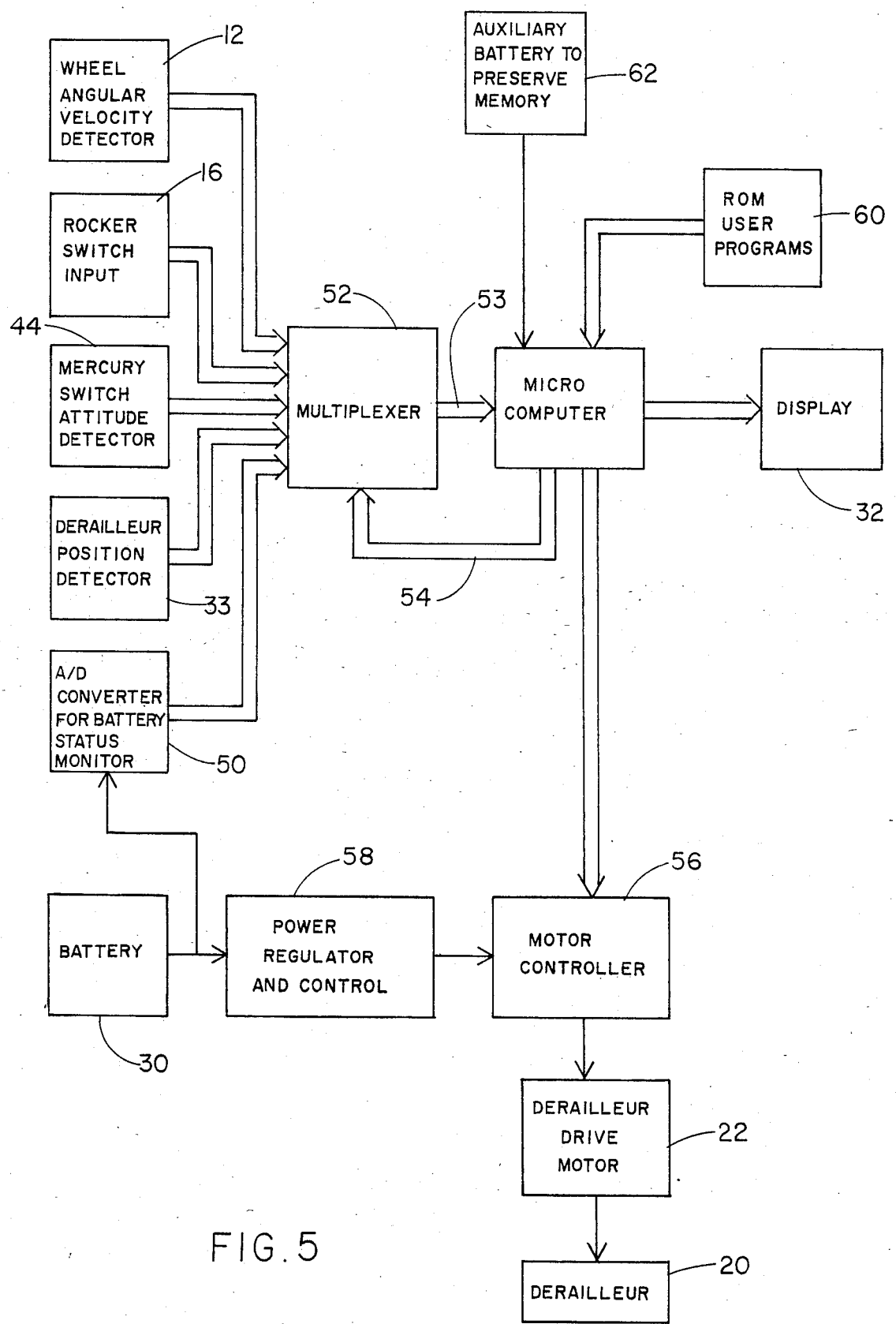
FIG. 5 is a diagram of the preferred embodiment of the invention.

FIG. 5 illustrates the electrical connection of the apparatus illustrated in FIG. 1. The angular velocity detector 12, the manual switches 16, the attitude detector 44, the derailleur position detector 33 and the battery status monitor formed by an A/D converter 50 are all connected to a multiplexer 52 which in turn is connected through the data bus 53 to the microcomputer. The multiplexer 52 is of course controlled through a control bus 54 by the microcomputer 18.

The microcomputer processes the input data signals to provide data output signals both to the display 32 and to the controller circuit 56 for the stepper motor 22 which drives the derailleur 20. A suitable power regulator and a power control circuit 58 may be provided if desired. It is also desirable to provide, in the conventional manner, for the connection of special program stored as firmware in read-only memories such as PROM 60 connected to the microcomputer. A variety of such programs may be provided to accomodate different riding conditions and the desires of different riders. For example, some may be provided for long distance riders, racing riders, sightseeing casual riders and for those who desire a lot of different display features.

As yet another alternative an auxiliary battery 62 may be provided for the purpose of preserving computer memory in the event of a failure of the battery 30.

In the operation of the circuit of FIG. 5, the principal input is the angular velocity signal from the angular velocity detector 12. As the disk 15 rotates a train of pulses is generated in the pick-up 13 and transmitted through the multiplexer to the microcomputer where the pulses are counted and the count accumulated in the conventional manner. Simultaneously, a count of the elapsed time during which the pulses are counted is also accumulated.

The pulses and time count data is processed by the computer to determine bicycle speed and also the accumulated total number of pulses may be processed to determine the total distance travelled.

The algorithm for determining bicycle speed is:

$$\text{speed (mph)} = 4.284 \times \frac{rN}{PS} \quad [1]$$

Figure 6:
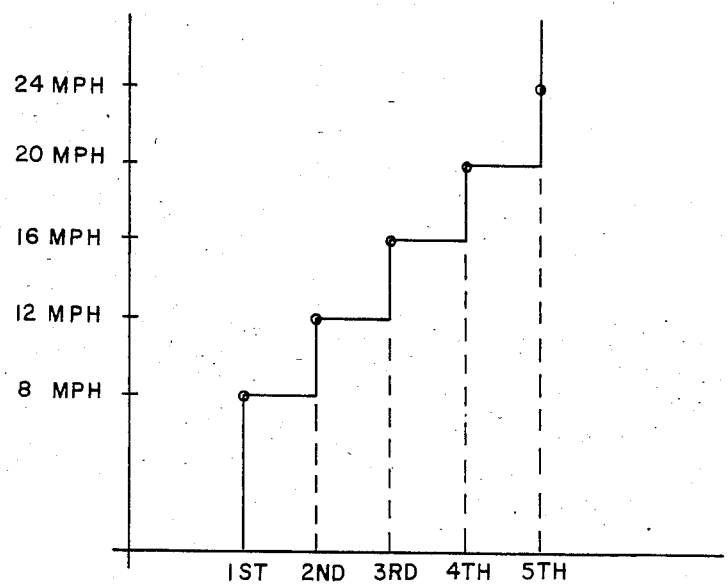
FIG. 6 is a graph illustrating the preferred relationship between bicycle speed and gear ratio for a 5 speed bicycle.

Wherein:
N = number of pulses counted during the counting interval
S = time, in seconds, of the pulse counting interval
P = number of pulses in each revolution of the vehicle wheel
r = radius of the wheel The algorithm for selecting the transmission position is based upon bicycle speed and is graphically illustrated in FIG. 6. FIG. 6 illustrates a typical shifting characteristic for a typical five sprocket transmission in which the fifth sprocket is the smallest in diameter and the first sprocket is the largest in diameter. It demonstrates that typically the transmission shifter will shift the derailleur to the highest torque, lowest speed position between 0 and 8 miles per hour and then will upshift typically at intervals of 4 miles per hour until the last sprocket is reached.

Thus, it is a relatively simple matter for a computer programmer of ordinary skill in the art to utilize the algorithm of equation I for detecting speed and then on the basis of that speed select the appropriate linear actuator position based on FIG. 6 which moves the derailleur to the appropriate position to accomplish the desired gear ratio.

One of the control switches 16 may be used to select either automatic shifting operation or, in the alternative, the locking of the derailleur in a selected position without regard to vehicle speed. A second rocker switch may be used to manually select either the highest or lowest gear ratio position in which the transmission may be locked.

Further, input from the mercury switch attitude detector 44 may be utilized to lock the transmission in a low speed, high torque position upon detection of an upward incline in order to meet the high torque needs of riding a bike up a hill. Similarly, the transmission may be automatically locked in the high speed during a descent.

Additional switches may be provided for instituting a display of vehicle speed, total distance travelled and battery condition in accordance with conventionally applied algorithms and data processing and programming principals.

While certain preferred embodiments of the present invention have been disclosed in detail, it is to be understood that various modifications in its structure may be adopted without departing from the spirit of the invention or the scope of the following claims.

We claim:

1. An improved automatic shifter for shifting the transmission of a human powered vehicle which includes pedals drivingly connected through a variable speed transmission to a wheel, said transmission including a movable shift member for changing the transmission ratio, wherein the improvement comprises:
   (a) a velocity detector means mounted to said vehicle for generating an electrical signal representing the velocity of a wheel of said vehicle;
   (b) a plurality of manual control switches;
   (c) a microcomputer having inputs connected to the output of said velocity detector means and to said control switches;
   (d) a digitally controlled motor/actuator means having its control input connected to an output port of said microcomputer and its output shaft linked to the shift member of said vehicle, said motor actuator means comprising a linear stepping actuator having a position detector means for providing electrical signals representing the current transmission ratio position, the output of said detector means being connected to an input port of said microcomputer, the position detector means comprising a cam mounted to the screw shaft of said linear actuator and a plurality of microswitches mounted about and axially spaced along said screw shaft and having their cam follower portions extending inwardly for engagement with said cam; and
   (e) a source of electrical energy connected for operating the above elements of said improvement.

* * * * *